US009089003B2

(12) United States Patent  
Karaoguz et al.

(10) Patent No.: US 9,089,003 B2  
(45) Date of Patent: Jul. 21, 2015

(54) QUALITY-OF-SERVICE (QOS)-BASED DELIVERY OF MULTIMEDIA CALL SESSIONS USING MULTI-NETWORK SIMULCASTING

(75) Inventors: Jeyhan Karaoguz, Irvine, CA (US); James D. Bennett, San Clemente, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 95 days.

(21) Appl. No.: 11/093,322

(22) Filed: Mar. 30, 2005

(65) Prior Publication Data

US 2006/0025148 A1 Feb. 2, 2006

Related U.S. Application Data

(60) Provisional application No. 60/591,735, filed on Jul. 28, 2004, provisional application No. 60/591,847, filed on Jul. 28, 2004, provisional application No. 60/591,844, filed on Jul. 28, 2004, provisional application No. 60/591,841, filed on Jul. 28, 2004, provisional application No. 60/591,845, filed on Jul. 28, 2004, provisional application No. 60/591,843, filed on Jul. 28, 2004, provisional application No. 60/591,842, filed on Jul. 28, 2004.

(51) Int. Cl.

| H04W 72/00 | (2009.01) |
|---|---|
| H04W 88/16 | (2009.01) |
| H04H 20/57 | (2008.01) |
| H04H 20/72 | (2008.01) |
| H04H 40/27 | (2008.01) |
| H04H 60/91 | (2008.01) |
| H04H 60/92 | (2008.01) |

(Continued)

(52) U.S. Cl.

CPC .............. *H04W 88/16* (2013.01); *H04H 20/57* (2013.01); *H04H 20/72* (2013.01); *H04H 40/27* (2013.01); *H04H 60/91* (2013.01); *H04H 60/92* (2013.01); *H04L 12/18* (2013.01); *H04L 47/14* (2013.01); *H04L 47/24* (2013.01); *H04L 65/103* (2013.01); *H04L 65/104* (2013.01); *H04L 65/1026* (2013.01); *H04L 65/1036* (2013.01); *H04L 65/1083* (2013.01); *H04L 65/4076* (2013.01); *H04N 21/4126* (2013.01); *H04N 21/4622* (2013.01); *H04N 21/6405* (2013.01); *H04W 4/06* (2013.01); *H04W 92/02* (2013.01)

(58) Field of Classification Search

CPC ..... H04W 28/18; H04W 28/20; H04W 28/22; H04W 28/24; H04W 28/26  
USPC ................................. 455/452.2, 558; 370/352  
See application file for complete search history.

(56) References Cited

U.S. PATENT DOCUMENTS 6,449,259 B1 * 9/2002 Allain et al. .................. 370/253  
6,567,387 B1 * 5/2003 Dulin et al. .................... 370/329

(Continued)

Primary Examiner — Mazda Sabouri  
(74) Attorney, Agent, or Firm — Brinks Gilson & Lione

(57) ABSTRACT

A method and system for the consumption of simulcasted or multicasted multimedia information via a wireless personal or local area network by a broadband access gateway, is disclosed. A user of an access device such as, for example, a mobile multimedia handset may engage in a call served by a wireless wide area network, and may consume components of multimedia information via the wireless wide area network. Additional components of the multimedia information may be provided to the user via a second communication path, based upon user-defined parameters in a user profile. Selected components or all of the multimedia information may be communicated to a broadband access gateway, where it may be cached, or simulcast to a plurality of access devices in a wired fashion, or wirelessly via a personal area and/or wireless local area network.

22 Claims, 8 Drawing Sheets

(51) Int. Cl.
*H04L 12/18* (2006.01)
*H04L 12/801* (2013.01)
*H04L 12/851* (2013.01)
*H04N 21/41* (2011.01)
*H04N 21/462* (2011.01)
*H04N 21/6405* (2011.01)
*H04L 29/06* (2006.01)
*H04W 4/06* (2009.01)
*H04W 92/02* (2009.01)

(56) References Cited

U.S. PATENT DOCUMENTS

| | | | |
|---|---|---|---|
| 8,713,641 B1* | 4/2014 | Pagan et al. | 726/4 |
| 2001/0049790 A1* | 12/2001 | Faccin et al. | 713/185 |
| 2002/0039892 A1* | 4/2002 | Lindell | 455/151.1 |
| 2002/0059434 A1* | 5/2002 | Karaoguz et al. | 709/228 |
| 2002/0077107 A1* | 6/2002 | Eng et al. | 455/445 |
| 2002/0110097 A1* | 8/2002 | Sugirtharaj et al. | 370/329 |
| 2003/0002460 A1* | 1/2003 | English | 370/331 |
| 2003/0156543 A1* | 8/2003 | Sahinoglu et al. | 370/238 |
| 2003/0193910 A1* | 10/2003 | Shoaib et al. | 370/331 |
| 2003/0236904 A1* | 12/2003 | Walpole et al. | 709/231 |
| 2004/0032882 A1* | 2/2004 | Kane | 370/477 |
| 2004/0045030 A1* | 3/2004 | Reynolds et al. | 725/110 |
| 2004/0082343 A1* | 4/2004 | Kim et al. | 455/456.1 |
| 2004/0100903 A1* | 5/2004 | Han et al. | 370/230 |
| 2004/0111476 A1* | 6/2004 | Trossen et al. | 709/206 |
| 2004/0192221 A1* | 9/2004 | Matsunaga | 455/76 |
| 2004/0203759 A1* | 10/2004 | Shaw et al. | 455/433 |
| 2005/0190747 A1* | 9/2005 | Sindhwani et al. | 370/352 |
| 2005/0226185 A1* | 10/2005 | Tell et al. | 370/331 |
| 2005/0255886 A1* | 11/2005 | Aaltonen et al. | 455/558 |
| 2005/0282490 A1* | 12/2005 | Nurmi | 455/11.1 |
| 2006/0126590 A1* | 6/2006 | Putcha et al. | 370/343 |

* cited by examiner

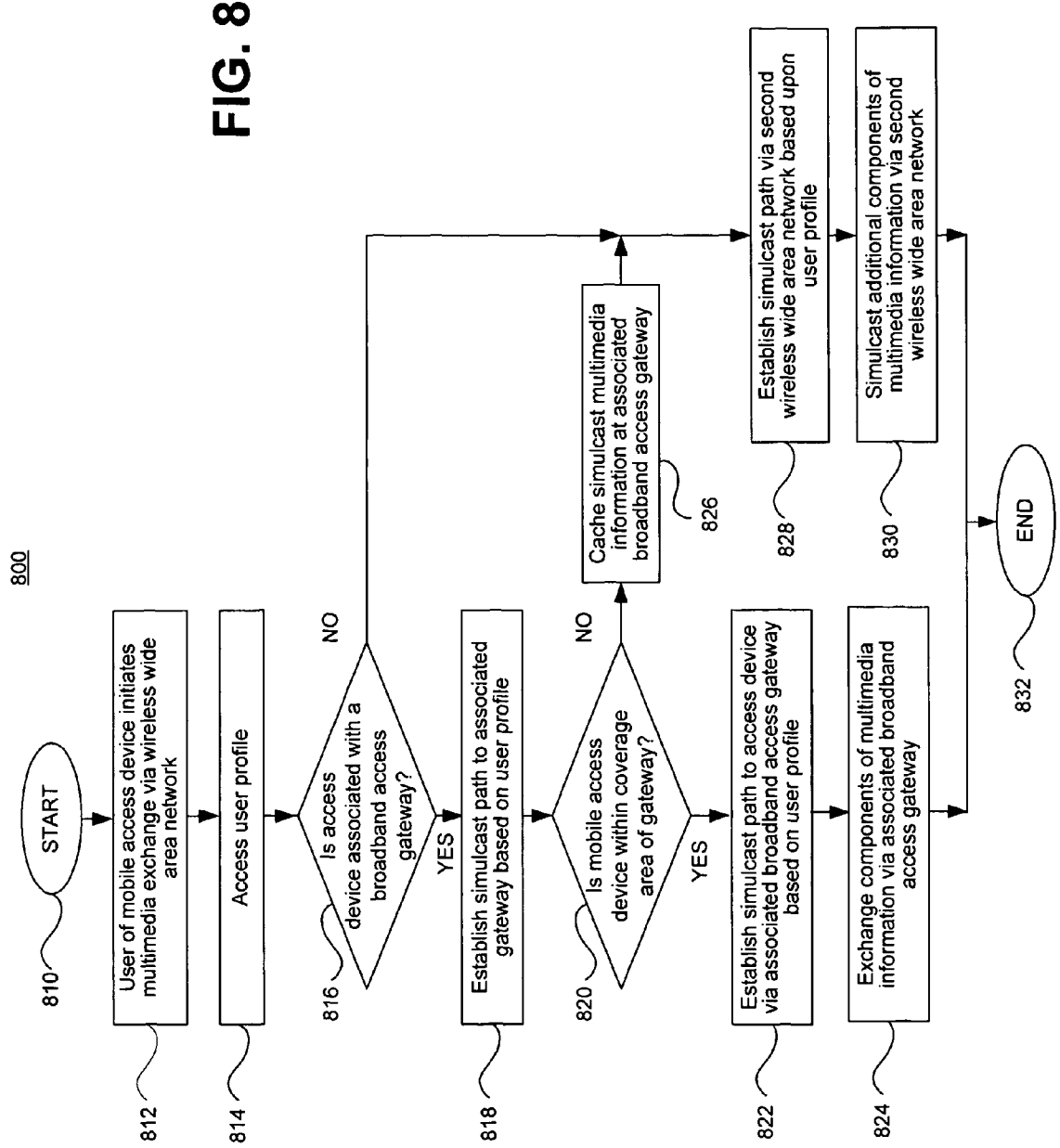

QUALITY-OF-SERVICE (QOS)-BASED DELIVERY OF MULTIMEDIA CALL SESSIONS USING MULTI-NETWORK SIMULCASTING

RELATED APPLICATIONS

The present application makes reference to, claims priority to, and claims the benefit of the following U.S. Provisional Patent Applications, the complete subject matter of each of which is hereby incorporated herein by reference, in its entirety.

| Ser. No. | Title | Date Filed |
|---|---|---|
| 60/591,735 | Method and System for Handoff Through Simulcasting | Jul. 28, 2004 |
| 60/591,847 | Method and System for Handling Calls Through Simulcasting | Jul. 28, 2004 |
| 60/591,844 | Method and System for Handling Multimedia Information Through Simulcasting | Jul. 28, 2004 |
| 60/591,841 | Method and System for Simulcasting or Multicasting Multimedia Information in a Broadband Wired and/or Wireless LAN or Personal Area Network (PAN) Via a Broadband Access Gateway | Jul. 28, 2004 |
| 60/591,845 | Method and System for Consuming Simulcasted and Multicasted Content in a PAN/WAN/WLAN Serviced by a Broadband Access Gateway | Jul. 28, 2004 |
| 60/591,843 | Method and System for Handoff of a Multimedia Stream by Sniffing | Jul. 28, 2004 |
| 60/591,842 | Method and System for Sniffing to Provide Association with a New Network | Jul. 28, 2004 |

The present application also makes reference to U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

The present application also makes reference to U.S. patent application Ser. No. 11/094,045, entitled "Handling Of Multimedia Call Sessions And Attachments Using Multi-Network Simulcasting", filed Mar. 30, 2005, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

Users of access devices served by wireless wide area networks may wish to access multimedia information that requires a larger amount of bandwidth than the wireless wide area network is able to provide, or for which the cost is such that the user is unwilling to pay for access. A user may access such multimedia information at little or no cost using conventional wired broadband services, but mobility is sacrificed. The quality of service that a user of such a device may experience is limited by that provided by the operator of the wireless wide area network, subject to the user's willingness to pay for service. In addition, even though a user may migrate within coverage of other, more capable or less expensive providers of bandwidth, the user is limited to the capabilities set at the initiation of the original wireless wide area communication session, and must initiate a new communication session with the new communication facility.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method supporting consumption of multimedia information using simulcasting via a broadband access gateway, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 shows a flowchart illustrating another exemplary method of consuming simulcasted and/or multicasted multimedia information via a broadband access gateway, in accordance with a representative embodiment of the present invention.

DETAILED DESCRIPTION OF THE INVENTION

Aspects of the present invention relate to communication over hybrid wired and wireless networks. More specifically, certain embodiments of the present invention relate to a method and system supporting the consumption of simulcasted and multicasted multimedia information content in a personal area network (PAN), a wireless wide area network (WAN), and a wireless local area network (WLAN) via a broadband access gateway.

An aspect of the invention provides seamless merging of wide area networks (WANs), from any kind of wired and/or wireless wide area networks, to pockets of wired and/or wireless local area networks (WLANs) and personal area network (PANs), which may be located in homes or other environment such as an office or business. The merging of these various types of networks enables transparent communication of all types of media between access devices, which may be wired or wirelessly coupled to one or more of these networks. Seamless communication may be provided to access devices as they transition from one type of network to another type of network. In a representative embodiment of the present invention, a user of an access device may consume multimedia information that may be communicated by a content provider using multiple information paths (i.e., simulcasted or multicasted), using a variety of different network technologies. Components of the multimedia information may be communicated to one or more access devices using a first network technology, while the same and/or different components may be communicated to the same and/or to other access devices using other network technologies.

Figure 1:
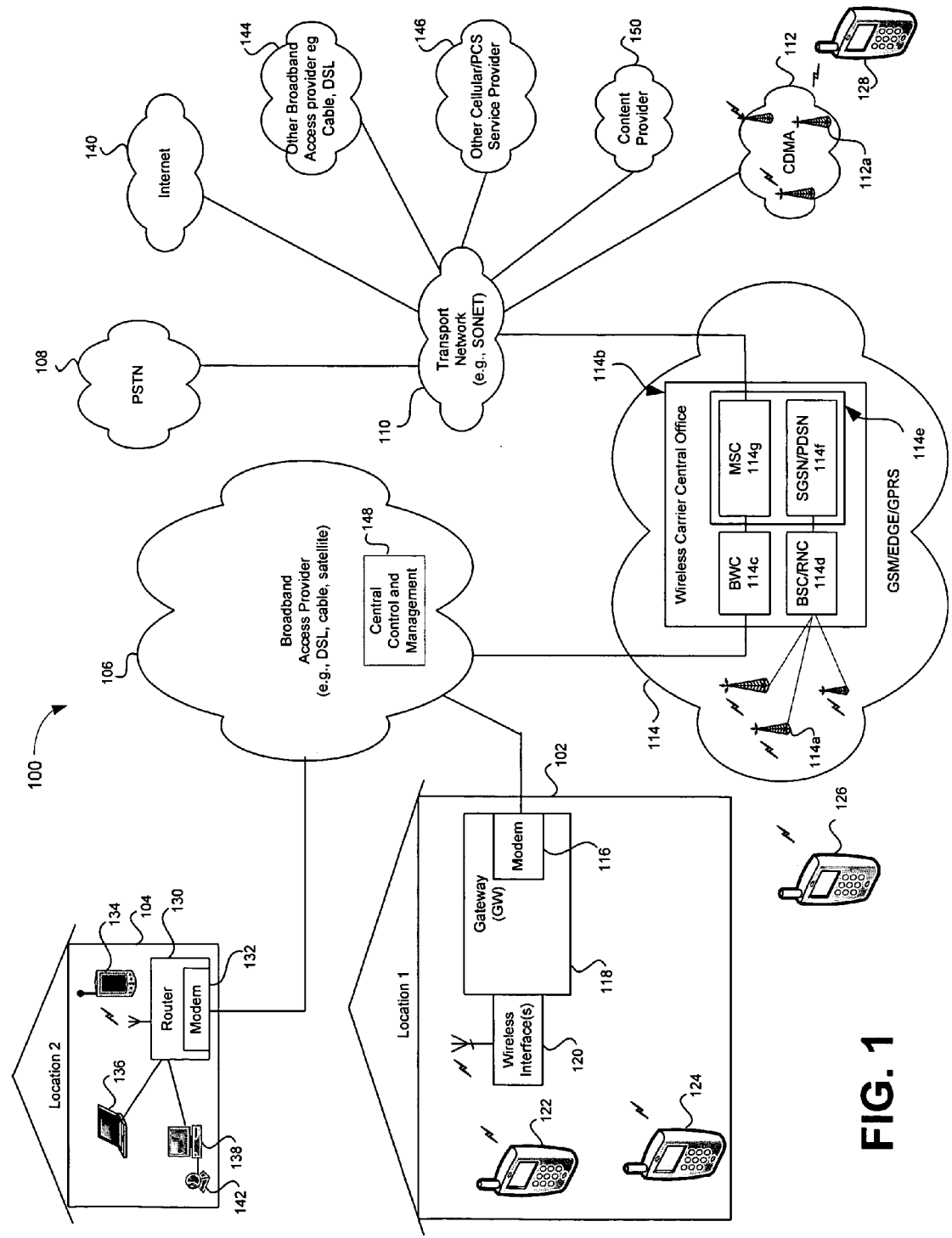
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, a public switched telephone network (PSTN) 108, a transport network 110, wireless service provider networks including a CDMA network 112 and a GSM/EDGE/GPRS network 114, and access devices 122, 124, 126, and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11 a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11 a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning, service management, and accounting. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM/EDGE/GPRS network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM/EDGE/GPRS networks 112, 114 may comprise a plurality of cell sites (a/k/a cellular towers) that are located in geographical cells within each of the networks. Within the GSM/EDGE/GPRS network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM/EDGE/GPRS network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM/EDGE/GPRS network 114 towards the wireless interface 120 in the first location 102, the call may be handed off from the cell site 114a of the GSM/EDGE/GPRS network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM/EDGE/GPRS network 114 via the broadband connection to the BAP 106 which is connected to the broadband wireless local area network controller (BWC) 114c.

In a representative embodiment of the present invention, an access device such as, for example, the access device 124 of FIG. 1 may be configured to communicate information utilizing a plurality of different pathways or channels in a receive and/or transmit direction. In an illustrative embodiment of the present invention, the access device may be adapted to communicate information utilizing, for example, three (3) different pathways. In this regard, the device may be adapted to receive information from three (3) different simulcasted and/or multicasted channels.

Each of the simulcasted channels and/or multicasted channels in a representative embodiment according to the present invention may be adapted to send the same data content such as multimedia information, for example. Multimedia information may comprise streaming video, broadcast video, voice, digital data, text, digitized audio, digitized still images, digitized video, and digitized music, for example. The multimedia information communicated via each channel may comprise the same data with each channel having different quality of service (QoS) characteristics. Examples of quality of service characteristics include, for example, bit rate, bandwidth, spatial resolution, number of gray scale levels, color depth, frame rate, number of dropped frames, cost of usage, level of distortion of an audio signal, and delivery delay. For example, a first communication channel may be adapted to communicate information at a first spatial resolution and/or data rate, a second communication channel may be adapted to communicate information at a second spatial resolution and/or data rate, and a third channel may be adapted to communication information at a third spatial resolution and/or data rate. Each of these communication channels may be priced differently. For example, a communication channel with a highest data rate and/or spatial resolution may be priced the highest and possess the lowest latency, while a channel with lowest data rate and/or spatial resolution may be priced the cheapest but possesses the greatest latency. A user of an access device may choose a channel that best suits their needs based on criteria such as pricing, latency, and/or other factors. A user of an access device may, for example, choose to interact with audio content on a first channel or pathway, and video content on a second channel or pathway in a representative embodiment of the present invention.

In another representative embodiment of the present invention, each of the simulcasted and/or multicasted channels may contain different data content. Accordingly, a user may select which channel to interact with in order to consume the data content for that channel. A user may choose to interact with any combination of a plurality of channels, or with just a single channel. For example, a user of an access device may be given the option to select 96, 128, 160 or 192 kbps audio content and/or low, medium or high-resolution video content. Hence, a user may select any one of the following exemplary combinations: 96 kbps audio on a first channel and a low resolution video on a second channel; 128 kbps audio on a first channel and a medium resolution video on a second channel; and 192 kbps audio on a first channel and a high resolution video on a second channel. The first channel may be, for example, a GSM/EDGE channel with a throughput of about 144 kbps, and the second channel may be, for example, a 1xRTT CDMA channel with a throughput of about 1 Mbps. Other channels having different data rates may also be utilized.

Selection of various channel combinations may be automatic or manual, and may be based on criteria such as, for example, signal quality, pricing and/or information content. In one representative embodiment of the present invention, automatic channel selection may be based on a user profile, which may be dynamically configured and/or changed. The user profile may comprise one or more selections and/or rules, which may indicate a desired signal quality, price and information content. For example, the user may indicate a minimal signal quality that should be received or is tolerable, and a maximum price to be paid for any information content, or for specific information content. For manual channel selection, for example, a user of an access device may be presented with a list of options, from which the user may select those options that are desirable. A default list of options may also be provided to facilitate faster selection, and these default selections may be changed or overridden at anytime.

Figure 2:
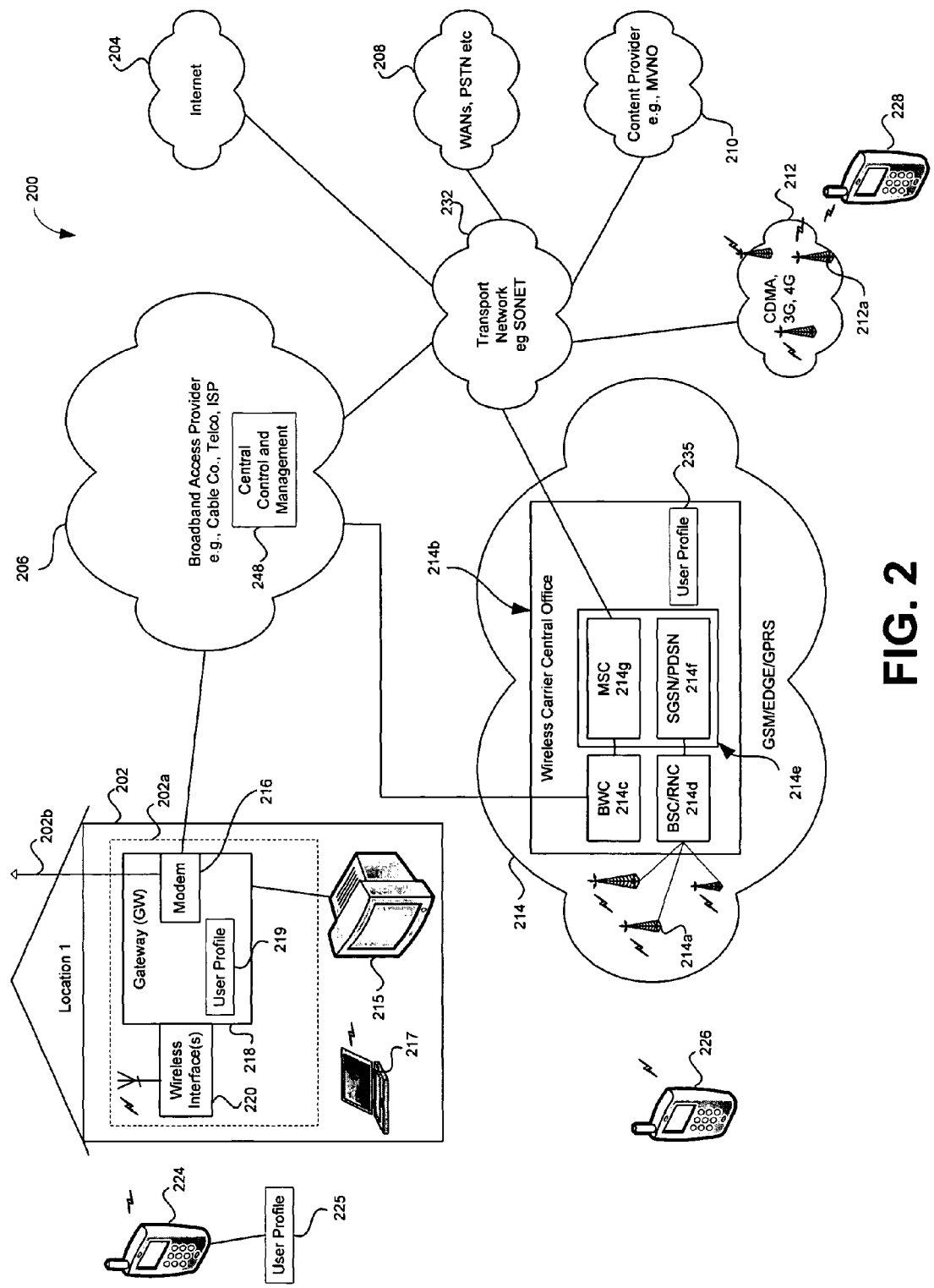
FIG. 2 shows a block diagram illustrating an exemplary communication system that may be utilized for simulcasting multimedia information in a broadband wireless local area network (WLAN) or personal area network (PAN), in accordance with a representative embodiment of the present invention.

FIG. 2 shows a block diagram illustrating an exemplary communication system 200 that may be utilized for simulcasting multimedia information in a broadband wireless local area network (WLAN) or personal area network (PAN), in accordance with a representative embodiment of the present invention. The exemplary communication system 200 of FIG. 2 provides handoff through simulcasting for wireless network traffic, for an active subscriber, from a wireless service provider servicing the active subscriber to a broadband wired and/or a wireless LAN (WLAN), and/or PAN using a broadband access gateway. Referring to FIG. 2, there is shown a first location 202, a broadband access provider (BAP) 206, a transport network block 232, an Internet 204, a WANs, PSTN, etc networks block 208, a content providers block 210, wireless wide area service provider networks 212, 214, and a plurality of mobile access devices 224, 226, 228. The illustration of FIG. 2 also comprises a central control and management block 248 that may correspond, for example, to the central control and management block 148 of FIG. 1.

The first location 202 comprises a broadband access gateway 218 with a modem 216, and a wireless interface 220. The first location may be a home, and the broadband access gateway 218 with the modem 216 and the wireless interface 220 may support a personal area network (PAN) and/or wireless local area network (WLAN), and may be referred to as a home network 202a. The wireless interface 220 may comprise a plurality of interfaces such as a Bluetooth interface, an IEEE 802.15.3a ultra-wideband interface, and any combination of IEEE 802.11 a, b, g and/or n interfaces. In a representative embodiment of the present invention, the broadband access gateway 218 may comprise, for example, a set top box that may be coupled in a wireless or wired fashion to access devices such as, for example, a laptop computer or television, such as the laptop 217 and the television 215 of FIG. 2. Service may be provided to the home network 202a supported by the broadband access gateway 218 via the cable modem 216, which is coupled to the broadband access provider 206. The wireless interface 220, the gateway 218 with modem 216, the BAP 206, the GSM/EDGE/GPRS network 214, the transport network 232, and the CDMA network 236 of FIG. 2 may correspond, for example, to the wireless interface 120, the gateway 118 with modem 116, the BAP 106, the GSM/EDGE/GPRS network 114, the transport network 110, and the CDMA network 112, respectively, of FIG. 1.

The broadband access provider 206 may be, for example, a cable company, telephone company (Telco), or an Internet service provider (ISP). The broadband access provider 206 may utilize any of the standardized formats such as DOCSIS, digital subscriber line (DSL), or local multipoint distribution system (LMDS). LMDS utilizes broadband wireless technology to deliver voice, video, data, and/or Internet services utilizing licensed or unlicensed spectrum in the frequency range of 25 GHz and higher. LMDS utilizes point-to-point or point-to-multipoint communication to provide broadband services, some of which rely on line of sight (LOS). LMDS is a fixed wireless solution, and as such, no mobility support is required.

The broadband access provider 206 may be also be a WiMAX or Institute of Electrical and Electronics Engineers, Inc. (IEEE) 802.16-compliant service provider. The IEEE 802.16 standard offers a wireless metropolitan area network (MAN) air interface which provides network access to buildings via external antennas that receive signals from a remotely located central base station. The signal received at the building may be communicated to a wired network infrastructure such as an IEEE 802.3 compliant communication network, or a wireless network infrastructure such as an IEEE 802.11a/b/g and/or n-compliant network. In instances where WiMAX is utilized, then antenna 202b may be utilized to receive and transmit signals between the broadband access provider 206 and the home network 202a.

The WANs, PSTN, etc networks block 208 may comprise networks such as private or public communication networks. For example, the WANs, PSTN, etc networks block 208 may comprise a public switched telephone network (PSTN) and a packet network such as a cellular digital packet data (CDPD) network.

The content providers block 210 may comprise network providers, which supply data and/or multimedia content. In a representative embodiment of the present invention, the content providers block 210 may comprise, for example, one or more mobile virtual network operators (MVNOs). A MVNO is a mobile service provider that provides mobile services to its subscribers by utilizing the network infrastructure of another company. In this regard, the MVNO enters into an agreement with a network operator to purchase network time such as minutes, which it resells to it own customers/subscribers. The MNVO utilizes the purchased time to provide, for example, multimedia content delivery to its subscribers.

The wireless service provider network 212 may, for example, utilize CDMA, 3G or 4G access technology and may comprise a plurality of cell sites. Cell site 212a may provide cellular service to the mobile access device 228 while the mobile access device 228 is within range of the cell site 212a. The wireless service provider network 214 may, for example, utilize the time division multiple access (TDMA) access technology of the GSM standard, and may include enhanced data rates for GSM evolution (EDGE) and/or general packet radio service (GPRS) data capability. The wireless service provider network 214 may comprise a plurality of cell sites and a wireless carrier central office 214b, the latter of which may comprise a mobile switching center (MSC) 214g. Cell site 214a may provide cellular service to mobile access device 226 while the mobile access device 226 is within range of the cell site 214a.

Figure 3:
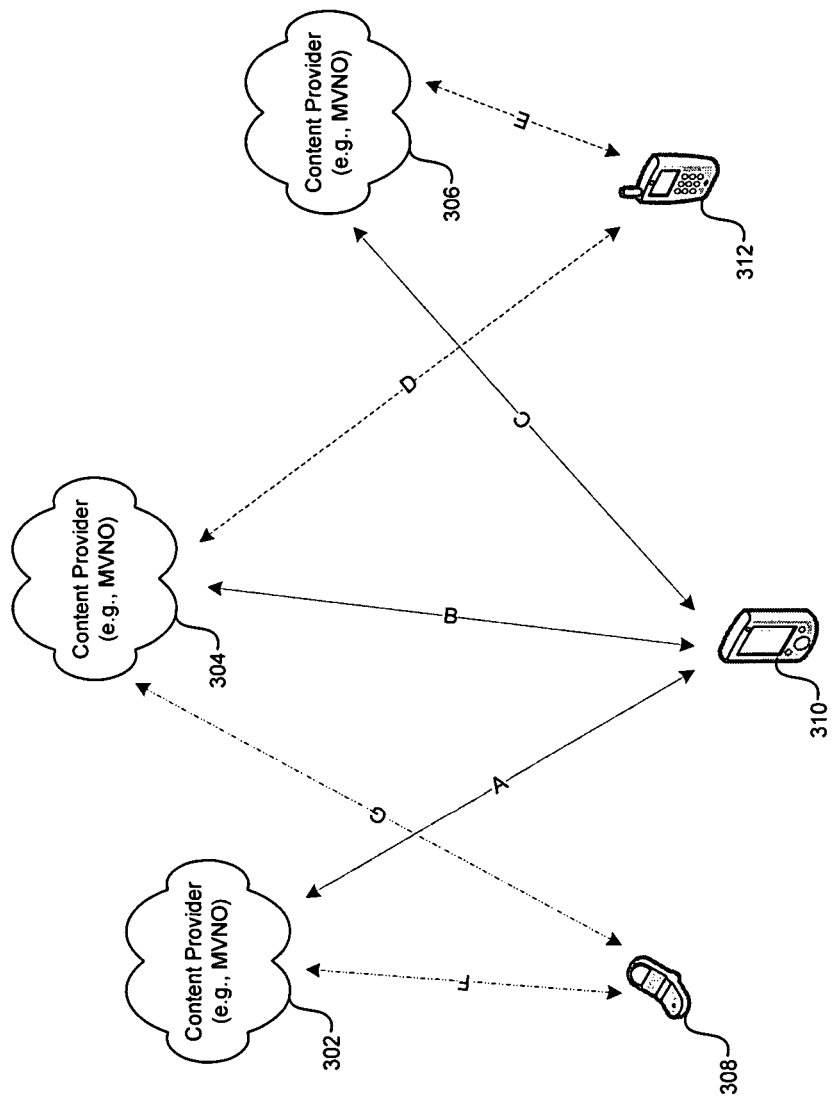
FIG. 3 is a block diagram illustrating an exemplary arrangement for the consumption of simulcasted or multicasted content in a PAN/WAN/WLAN serviced via a broadband access gateway, in accordance with a representative embodiment of the present invention.

FIG. 3 is a block diagram illustrating an exemplary arrangement for the consumption of simulcasted or multicasted content in a PAN/WAN/WLAN serviced via a broadband access gateway, in accordance with a representative embodiment of the present invention. Referring to FIG. 3, there is shown a plurality of content providers 302, 304, 306, a plurality of access devices 308, 310, 312, and a plurality of channels A, B, C, D, E, F and G. Channels G, B and D of FIG. 3 originate from content provider 304, channels C and E originate from content provider 306, and channels F and A originate from content provider 302.

In its current location, the access device 308 is situated so that it receives simulcasted or multicasted information from the content provider 302 via communication channel F, and from the content provider 304 via communication channel G. In its current location, the access device 310 is situated so that it receives simulcasted or multicasted information from all of the content providers 302, 304 and 306. In this regard, the access device 310 receives simulcasted or multicasted information from content provider 302 via communication channel A, from content provider 304 via channel B, and from the content provider 306 via communication channel C. Finally, in its current location, the access device 312 is situated so that it receives simulcasted or multicasted information from content providers 304 and 306 via communication channels D and E, respectively.

In a representative embodiment of the present invention, simulcasted and/or multicasted channels such as, for example, the channels A, B, C, D, E, and F of FIG. 3 may be adapted to communicate the same type of information content and/or different types of information, and each channel may offer a different QoS, delivery data rate and/or data resolution. In a case where, for example, channels A, B and C carry the same data content but the QoS of each of the channels are different, then a user of access device 310 may have the option to select which of channels A, B and C best suits their needs. For example, channel A may carry multimedia information 192 kbps, channel B may communicate the same information at 128 kbps, and channel C may support communication of such multimedia information at 96 kbps. In this regard, the user of access device 310 may select channel B, since channel C may be too expensive, and the data rate of channel B is satisfactory and more affordable, even though channel C may have the higher data quality. Alternatively, the user of access device 310 may select channel C if quality associated with the higher data rate is the most important criteria and cost is not a major factor.

Figure 4:
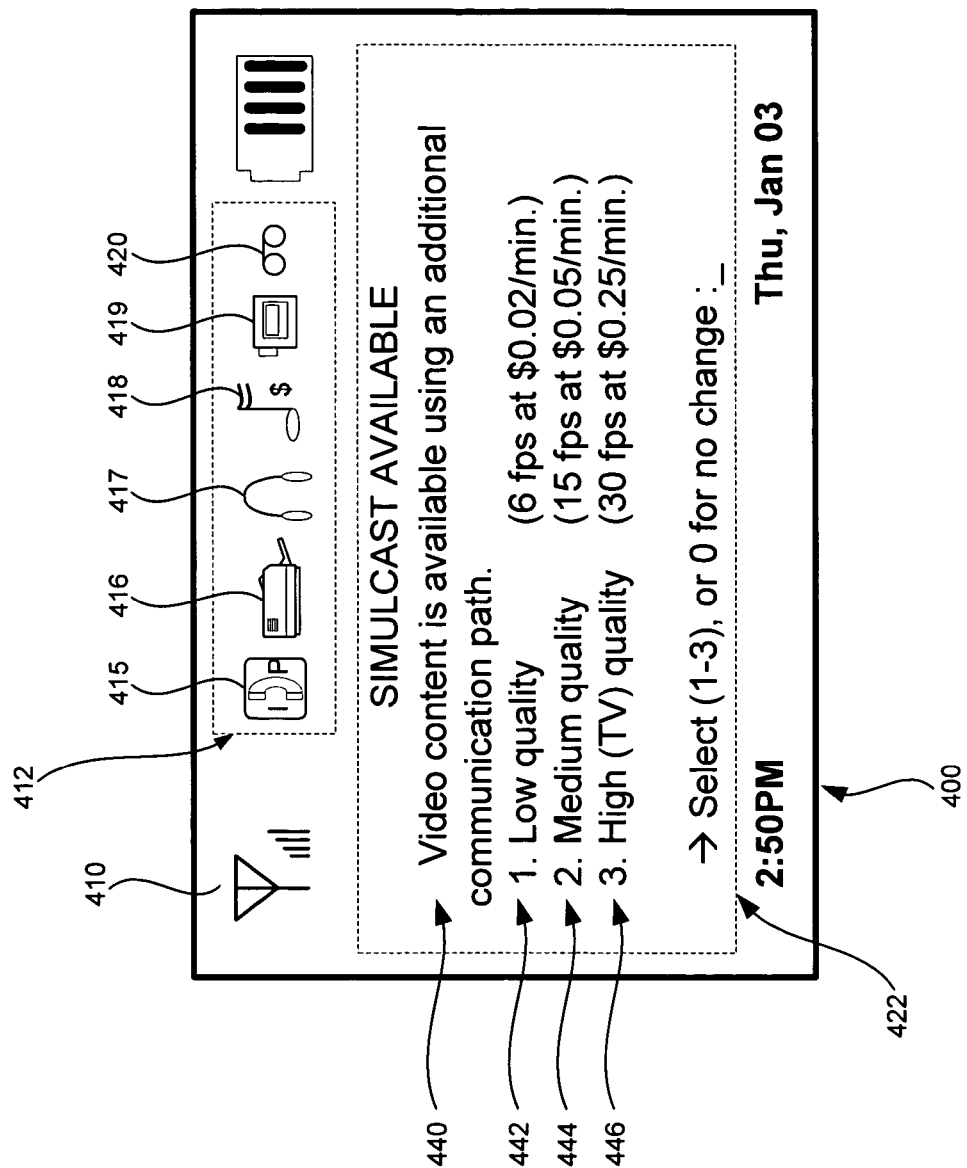
FIG. 4 shows an illustration of a display comprising an exemplary notification screen that may be employed to inform a user of an access device such as, for example, the access device of FIG. 2, of simulcasting options available for the consumption of multimedia information, in accordance with a representative embodiment of the present invention.

In a representative embodiment of the present invention, a user of an access device such as, for example, the access device 224 of FIG. 2 may communicate some components of multimedia communication via one communication path or channel, while communicating other components of the multimedia communication via a second or other communication path or channel. For example, a user of the access device 224 being served by the GSM/EDGE/GPRS network 214 may receive a multimedia call, or access multimedia information content, that comprises both an audio voice component and a video information component. The wireless carrier central office 214b of the GSM/EDGE/GPRS network 214 may recognize the bandwidth limitation of the wireless communication channel currently available, and may notify the user of an option to pay for additional communication bandwidth FIG. 4 shows an illustration of a display 400 comprising an exemplary notification screen 422 that may be employed to inform a user of an access device such as, for example, the access device 224 of FIG. 2, of simulcasting options available for the consumption of multimedia information, in accordance with a representative embodiment of the present invention. The display 400 of FIG. 4 comprises a network indicator 410, a network services indicator area 412, a battery life indicator, a time of day indicator, and a day and date indicator. The network services indicator area 412 of FIG. 4 comprises an Internet protocol (IP) phone service icon 415, a printer service icon 416, a stereo entertainment icon 417, a pay music service icon 418, a video entertainment icon 419, and a call recording icon 420 showing those services that may be advertised by a broadband access gateway such as, for example, the gateway 218 of FIG. 2, as being available to an appropriately identified or authorized user of the access device.

In a representative embodiment of the present invention, the notification screen 422 of FIG. 4 may be displayed when, for example, it is determined that multimedia information components may be communicated to a mobile access device such as the mobile access devices 224, 226, 228 of FIG. 2 by employing simulcasting in accordance with a representative embodiment with the present invention. The notification screen 422 comprises explanatory text 440 informing the user of a mobile access device such as, for example, the mobile access device 224 that video content is available to the user of the access device 224 through the use of an additional communication path. The exemplary notification screen 422 offers the user of the access device 224 three options through which they may request the establishment of additional, simulcast communication paths or channels to add a video component to the multimedia communication. The first option 442 shown in the notification screen 422 of FIG. 4 may be selected to provide "Low quality" video at 6 frames per second (fps) for a cost of $0.02 per minute. The second option 444 offers the user "Medium quality" video at 15 fps for a cost of $0.05 per minute. Finally, the third option 446 provides access to "High (TV) quality" video at 30 fps for $0.25 per minute. The user may select such options using, for example, key presses on the keypad of a mobile multimedia handset or personal computer. The notification screen 422 also offers the user the option of continuing the communication supported by the present communication paths or channels, by selecting "0". Network support of the addition of a video or other multimedia component may entail the establishment of additional paths or channels from a content source. For example, additional paths or channels may be established between the content provider 210, or another multimedia information source such as, for example, an access device in communication with the broadband access gateway 218 or a wireless wide area network such as CDMA network 212, for example. A communication system in accordance with a representative embodiment of the present invention may permit a user to specify, for example, rules, guidelines, conditions, limits, and/or values that enable the communication system to provide a desired quality of service within acceptable costs by using simulcasting and/or multicasting of multimedia information.

In a representative embodiment of the present invention, a user of an access device such as, for example, the access device 224 of FIG. 2 that is served by a wireless wide area network such as, for example, the GSM/EDGE/GPRS network 214 may desire to access multimedia content. The multimedia content of interest may be located on a content provider such as, for example, the content provider 210 of FIG. 2. When the user of the access device 224 initiates such an access, the wireless carrier central office 214b of the GSM/EDGE/GPRS network 214 may determine, for example, that the user and/or the access device 224 is associated with a broadband access gateway such as the broadband access gateway 218 of FIG. 2. This may be determined using information maintained by the GSM/EDGE/GPRS network 214 in, for example, a subscriber database or a user profile, such as the user profiles 219, 225, 235. Depending upon the location of the access device 224 relative to the broadband access gateway 218, and parameters in the user profile 225, for example, the wireless carrier central office 214b may arrange to simulcast the accessed multimedia information to both the access device 224 and to the broadband access gateway 218. The multimedia information communicated with the access device 224 may be selected to accommodate the capabilities of the access device 224 and/or the preferences of the user of the access device 224, as indicated in the user profile 225. Such a user profile may be stored on the access device 224 as user profile 225, for example, and may also be located at the wireless carrier central office 214b as user profile 235, or at the broadband access gateway 218 as user profile 219, for example.

A representative embodiment of the present invention may automatically select additional communication paths to the access device 224, and/or the broadband access gateway 218, in order to communicate multimedia information to/from the user of the access device 224. The multimedia information intended for communication to the user of the access device 224 via the GSM/EDGE/GPRS network 214 may comprise multiple components such as, for example, an audio portion and a video portion. Following initiation of communication with the access device 224, the wireless carrier central office 214b may access parameters in a user profile such as, for example, the user profile 235, and may determine that access device 224 is associated with the broadband access gateway 218. Prior to communicating multimedia information to/from the access device 224, the wireless carrier central office 214b may reference parameters in the user profile 235 to determine user preferences regarding the paths or channels used for communication with the access device 224. Such preferences may include user-selected values, guidelines, and/or limits for one or more of the quality of service characteristics described above. In one representative embodiment of the present invention, the wireless carrier central office 214b may elect to provide only the audio portion of the multimedia information based upon, for example, a cost of providing a channel supporting the communication of the video portion of the multimedia information. In another representative embodiment, the wireless carrier central office 214b may provide a lower quality video portion. At some later point during communication, the wireless carrier central office may recognize that the access device 224 is within the coverage area of the broadband access gateway 218, for example, and may determine that the cost of communicating the video portion of the multimedia information via the broadband access gateway 218 is within the user preferences in the user profile 235. The wireless carrier central office 214b may then simulcast the full quality video portion of the multimedia communication to the access device 224 via the broadband access provider 206, the broadband access gateway 218, and the wireless interface 220. The access device 224 may continue to receive the audio portion via the GSM/EDGE/GPRS network 214 and the video portion via the broadband access gateway 218 and wireless interface 220. The user may also elect to receive the audio portion of the multimedia information via the broadband access gateway 218, if resources are available, and transfer of the entire communication is permitted.

In another representative embodiment of the present invention, communication of multimedia information to/from an access device such as, for example, the access device 224 may involve simulcasting to two or more separate network locations by a wireless wide area network such as, for example, the GSM/EDGE/GPS network 214 of FIG. 2. Each of the locations such as, for example, locations 102 and 104 of FIG. 1, may be identified as associated with the access device 224 in a user profile such as, for example, the user profiles 219, 225, and 235 of FIG. 2. Characteristics related to the communication of multimedia information to/from each location, and user preferences related to each location may also be present in a user profile such as, for example, the user profile 235. Such information may permit the wireless carrier central office 214b of FIG. 2, for example, to communicate appropriately selected and adapted multimedia information to/from each of the identified locations when the access device 224 is actively engaged in multimedia exchange. This may enable a user of the access device 224 to migrate into the coverage areas of personal area or wireless local area networks supported by, for example, the broadband access gateway and wireless interface 220 at location 102 of FIG. 1, or the router at location 104 of FIG. 1. Using the access device 224, the user may then engage in the consumption of multimedia information in a simulcast fashion, via the paths of a wireless wide area network such as, for example, the GSM/EDGE/GPRS network 214, and a broadband network using access provided via broadband access gateway such as the broadband access gateway 218, for example.

In yet another representative embodiment of the present invention, multimedia information may be communicated via a number of paths or channels at different quality of service levels. For example, a user of an access device such as the access device 224 of FIG. 2 may desire to engage in multimedia communication with, for example, a content provider such as the content provider 210 of FIG. 2, or a user of another access device such as access device 226. Before initiating or accepting multimedia communication, the user of the access device 224 may be presented with a selection of available communication paths or channels from which to choose. In one representative embodiment of the present invention, such information may be provided via a broadband access gateway such as the broadband access gateway 224 of FIG. 2, while in another representative embodiment, a wireless wide area network, such as the GSM/EDGE/GPRS network 214, for example, may provide such information. The multimedia information may be simulcasted via each of the available channels, at a different quality of service level (e.g., different bandwidth, bit rate, color depth, frame rate, etc.), and the user may select the level of quality consumed by selecting which of the simulcasted channels to receive. In one representative embodiment of the present invention, the simulcasted paths or channels of multimedia information may be communicated using different network technologies such as, for example, a wireless local area network compliant with IEEE 802.11b that may be supported by the wireless interface 216, a CMDA data channel supported by the CMDA network 212, and a GPRS data channel supported by the GSM/EDGE/GPRS network 214, of FIG. 2. In another representative embodiment, the simulcasted paths or channels of multimedia information may be communicated using a single network technology such as, for example, a wideband wireless service such as, for example, WiMAX, providing a communication path via the antenna 202b shown in FIG. 2.

Figure 5:
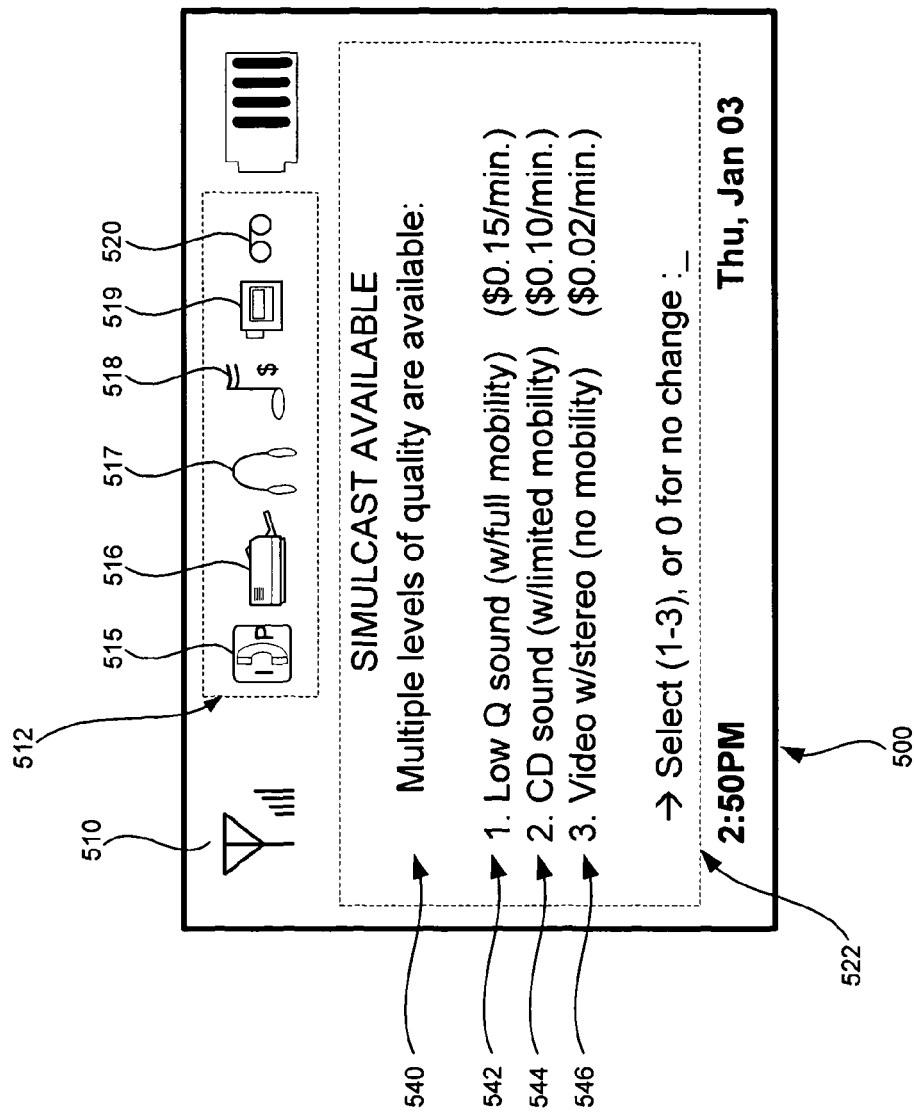
FIG. 5 shows an illustration of a display comprising an exemplary notification screen that may be employed to inform a user of an access device such as, for example, the access device of FIG. 2, of a variety of quality options available via simulcasting of multimedia information, in accordance with a representative embodiment of the present invention.

FIG. 5 shows an illustration of a display 500 comprising an exemplary notification screen 522 that may be employed to inform a user of an access device such as, for example, the access device 224 of FIG. 2, of a variety of quality options available via simulcasting of multimedia information, in accordance with a representative embodiment of the present invention. The display 500 of FIG. 5 comprises a network indicator 510, a network services indicator area 512, a battery life indicator, a time of day indicator, and a day and date indicator. The network services indicator area 512 of FIG. 5 comprises an Internet protocol (IP) phone service icon 515, a printer service icon 516, a stereo entertainment icon 517, a pay music service icon 518, a video entertainment icon 519, and a call recording icon 520 showing those services that may be advertised by a broadband access gateway such as, for example, the gateway 218 of FIG. 2, as being available to an appropriately identified or authorized user of the access device.

In a representative embodiment of the present invention, the notification screen 522 of FIG. 5 may be displayed when, for example, it is determined that multiple levels of multimedia information quality may be communicated to a mobile access device such as the mobile access devices 224, 226, 228 of FIG. 2 by employing simulcasting in accordance with a representative embodiment with the present invention. The notification screen 522 comprises explanatory text 540 informing the user of a mobile access device such as, for example, the mobile access device 224 that multiple levels of quality are available to the user of the access device 224. The exemplary notification screen 522 offers the user of the access device 224 three options through which the user may consume multimedia content. The option 1 542 offers "Low Q sound (w/full mobility)" at a cost of $0.15 per minute. This option may reflect access to a simulcast multimedia channel communicated via, for example, a wireless wide area network such as the GSM/EDGE/GPRS network 214 of FIG. 2. Although the user experience is the lowest in quality, the user has complete mobility within the coverage area of the serving wireless wide area network. As shown in FIG. 5, option 2 544 may provide access to "CD sound (w/limited mobility)" at a cost of $0.10 per minute. This selection provides a higher level of quality that option 1 542 at a slightly lower cost that option 1 542, but at a reduced level of mobility. This may correspond to, for example, a simulcast communication path or channel supported using a wireless local area network such as an IEEE 802.11 network shared with other users. The third option of FIG. 5, option 3 546, may permit a user to enjoy "Video w/stereo (no mobility)" at a cost of only $0.02 per minute. This choice may provide a user with the highest level of quality at the lowest cost per minute of multimedia consumption, but severely restricts the user's mobility. This option may correspond to, for example, a simulcast communication path provided by a Bluetooth or IEEE 802.15.3a personal area network.

Although the discussion of FIG. 5 describes a manual selection of the level of quality, and the use of multiple simulcasted paths for transport of multimedia information, a representative embodiment of the present invention may also automatically select multiple, simulcasted communications paths or channels, without user intervention. Such automatic selection may be based upon, for example, a quality of service level including characteristics such as bandwidth, bit rate, color depth, frame rate, and user preferences, guidelines, values, limits, and the like, that may reside in a user profile. A communication system in accordance with a representative embodiment of the present invention permits a user to specify, for example, rules, guidelines, conditions, limits, and/or values that enable the communication system to provide a desired quality of service within acceptable costs by using simulcasting and/or multicasting of multimedia information.

Figure 6:
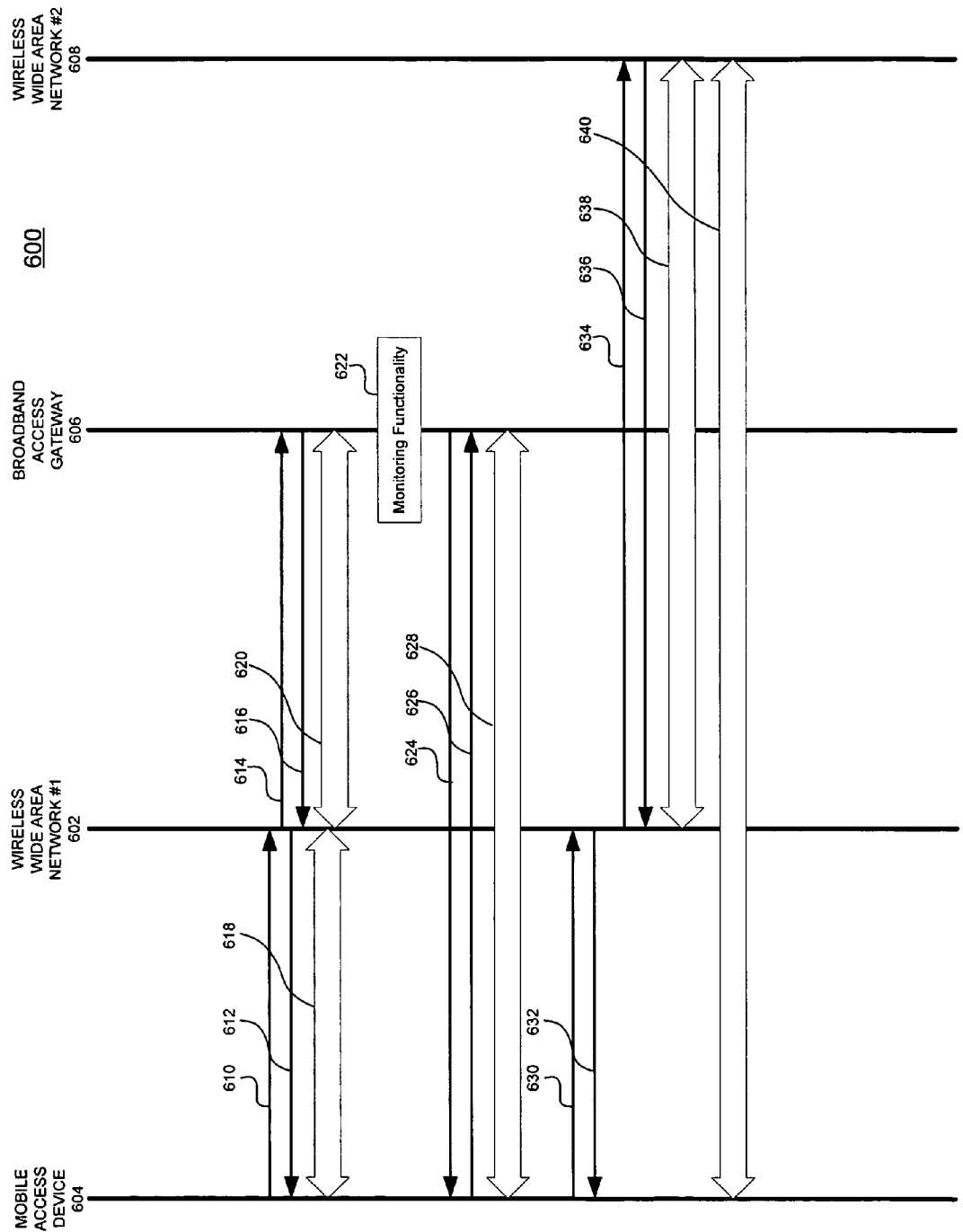
FIG. 6 is a message exchange diagram illustrating an exemplary exchange of multimedia information using simulcasting involving a wireless wide area network such as, for example, the GSM/EDGE/GPRS network of FIG. 2, and a broadband access gateway, in accordance with a representative embodiment of the present invention.

FIG. 6 is a message exchange diagram 600 illustrating an exemplary exchange of multimedia information using simulcasting involving a wireless wide area network such as, for example, the GSM/EDGE/GPRS network 214 of FIG. 2, and a broadband access gateway, in accordance with a representative embodiment of the present invention. In the illustration of FIG. 6, the four vertical lines represent a wireless wide area network #1 602, a mobile access device 604, a broadband access gateway 606, and a wireless wide area network #2 608 that may correspond to, for example, the GSM/EDGE/GPRS network 214, the mobile access device 224, the broadband access gateway 218, and the CDMA network 212, respectively, of FIG. 2. The horizontal lines of FIG. 6 represent message traffic or groups of messages exchanged between a source and a destination, the destination being indicated by the arrow head. The vertical dimension represents time, advancing downward on the message exchange diagram 600.

In a representative embodiment of the present invention, the mobile access device 604 may initiate an exchange of multimedia information via the wireless wide area network #1 602 using messaging 610, 612 with any of several network entities including, for example, another mobile access device served by the wireless wide area network #1 602, or a party accessible via the transport network 232 of FIG. 2 such as, for example, the content provider 210. Although this example describes the initiation of an exchange by the mobile access device 604, a similar sequence of events within the spirit and scope of the present invention may be applied to exchanges involving the mobile access device 604 that are initiated by other than the mobile access device 604. The messaging 610, 612 may comprise multiple messages for establishing communication between the mobile access device 604 and the wireless wide area network #1 602. In the illustration of FIG. 6, the wireless wide area network #1 602 may activate path 618 to transport multimedia information between the wireless wide area network #1 602 and the mobile access device 604. During establishment of the path 618, the wireless wide area network #1 602 may access parameters stored in a corresponding user profile, as described above, and may determine that the mobile access device 604 is associated with the broadband access gateway 606. The wireless wide area network #1 602 may also determine what of the components of the multimedia information it may exchange with the mobile access device 224, based upon information available in, for example, the user profile The wireless wide area network #1 602 may then employ messaging 614, 616 to establish a second, simulcast path 620 to the broadband access gateway 606 for the transport of the components of the multimedia information exchange between the wireless wide area network #1 602 and the mobile access device 604 via the path 618. In one representative embodiment of the present invention, the broadband access gateway 606 may employ monitoring functionality 622 to detect signals on a personal or wireless local area network, and may establish a second, simulcast path 628 with the mobile access device 604 using messaging 624, 626 to transport other multimedia information components. In another representative embodiment, the broadband access gateway 606 may begin caching the remainder or all of the multimedia information received via path 620, and may later establish a second path 628 to the mobile access device 604.

At some later point in the exchange, the user of mobile access device 604 may wish to exchange or access components of multimedia information that require bandwidth not currently available, or not within the parameters, guidelines, limits, etc., of a user profile for the user of mobile access device 604, for example. The mobile access device 604 may then request establishment of an additional simulcast path using messaging 630, 632. The serving wireless wide area network may determine that a wireless wide area network #2 608 is capable of providing the desired bandwidth, and may request the establishment of a third simulcast path using messaging 634, 636. The wireless wide area network #1 602 may then establish a path for multimedia information to/from the wireless wide area network #2 608, that may then begin exchange of the additional multimedia information components with the mobile access device 604 via path 640.

Although the example of FIG. 6 employed three simulcasted paths carrying components of a multimedia information exchange carried on paths involving three different networks (i.e., the wireless wide area network #1 602, the personal/wireless local area network of the broadband access gateway 606, and the wireless wide area network #2 608), all of the simulcasted paths may be between the mobile access device 604 and a single second entity such as, for example, the wireless wide area network #1 602. In addition, in the illustration of FIG. 6, all of the simulcasted paths have a common origin at the wireless wide area network #1 602. This does not represent a particular limitation of the present invention. The components of multimedia information simulcasted by various paths or channels may originate at separate entities such as, for example, the content provider 210, the Internet 204, and the CDMA network 212 of FIG. 2, without departing from the spirit and scope of the present invention.

In a representative embodiment of the present invention, components of multimedia information may be consumed by multiple access devices via a broadband access gateway such as the broadband access gateway 218 of FIG. 2. For example, individual simulcast paths or channels may be exchanged with the mobile access device 224, the laptop 217, and the television 215, for example, via the paths or channels of the personal area and/or wireless local area networks supported by the wireless interface 220 of the broadband access gateway 218 of FIG. 2. Components of a multimedia exchange between an access device (e.g., the access device 224) and a wireless wide area network (e.g., the GSM/EDGE/GPRS network 214) may be simulcasted to a broadband access gateway such as, for example, the broadband access gateway 218 of FIG. 2. Although an access device in communication with the wireless wide area network 214 may exchange and consume a limited portion of the multimedia information seen by the wireless wide area network 214, the wireless wide area network 214 may simulcast a larger portion or all of the multimedia information to a broadband access gateway such as, for example, the broadband access gateway 218. The broadband access gateway 218 may then simulcast the entire exchange to a collection of access devices within the coverage area of a personal and/or wireless local area network such as, for example, those networks supported by the wireless interface 220 of FIG. 2. For example, the access device 224 may consume only the audio portion of a multimedia exchange, while the serving wireless wide area network (e.g., the GSM/EDGE/GPRS network 214) may simulcast the entire multimedia exchange to the broadband access gateway 218. The broadband access gateway 218 may then simulcast a stereo audio portion to a stereo system (not shown) at location 102, a video portion to the television 215, and accompanying spreadsheet data (not shown) to the laptop 217.

Figure 7:
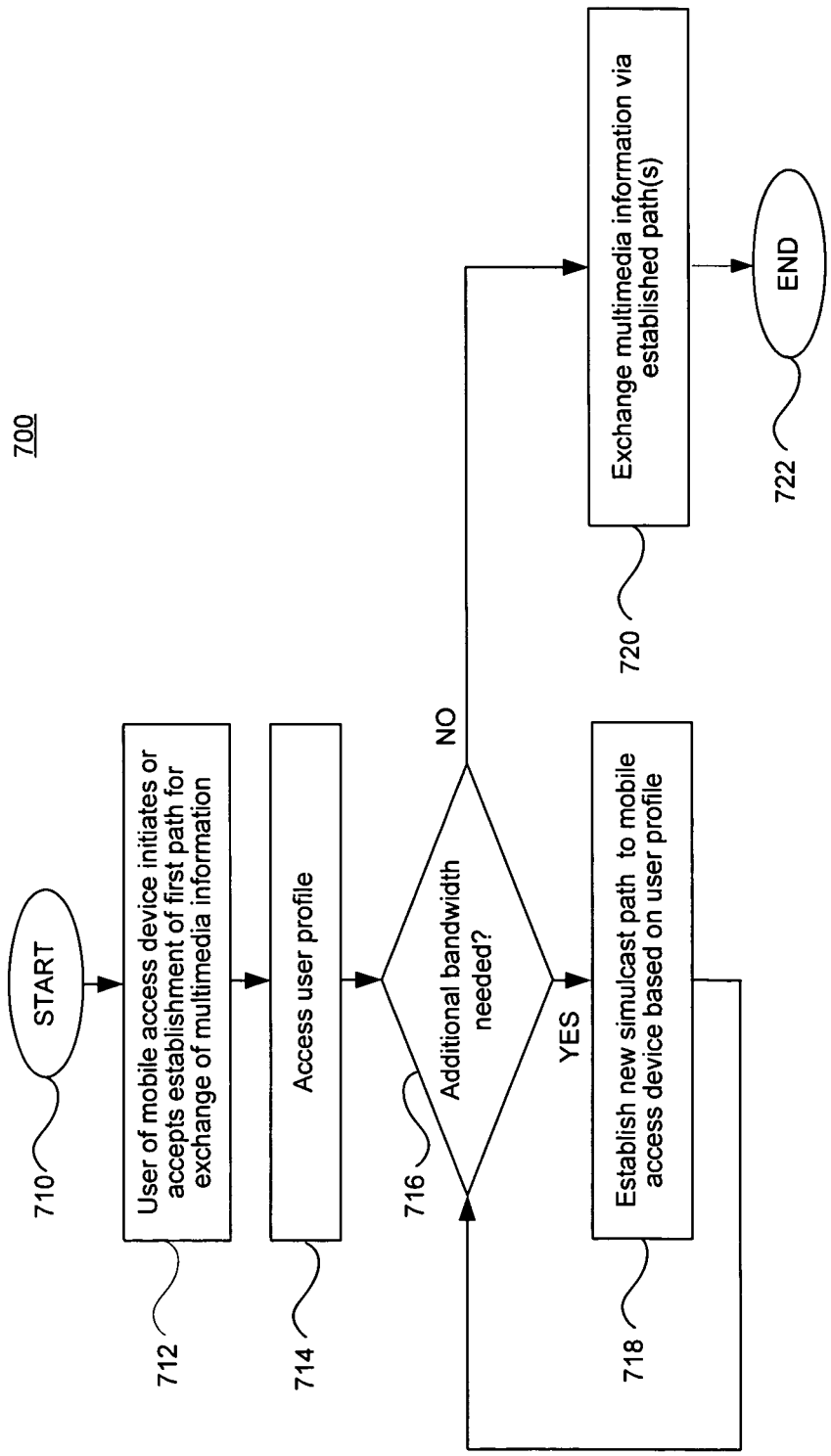
FIG. 7 shows a flowchart illustrating an exemplary method of consuming simulcasted and/or multicasted multimedia information via a broadband access gateway, in accordance with a representative embodiment of the present invention.

FIG. 7 shows a flowchart illustrating an exemplary method of consuming simulcasted and/or multicasted multimedia information via a broadband access gateway, in accordance with a representative embodiment of the present invention. As an aid to understanding the method of FIG. 7, the following description makes reference to elements of FIG. 2. The method of FIG. 7 begins with a mobile access device such as, for example, the mobile access device 224 in an idle state (block 710). At some point, the user of the mobile access device 224 elects to initiate or accept the establishment of a communication path or channel for the exchange of multimedia information (block 712). This may result from the placing or acceptance of a call involving multimedia information, or an attempt to access a source of multimedia information via, for example, a wireless wide area network such as the GSM/EDGE/GPRS network 214 of FIG. 2. In the process of establishing the path, the GSM/EDGE/GPRS network 214 may access a user profile or subscriber information such as, for example, the user profile 219 accessible to the broadband access gateway 218 (block 714). The user profile may contain, for example, user-define guidelines, limits, values, rules, capabilities, and parameters to be employed in the selection of the network resources used to provide service to the user.

The communication path between the user access device 224 and the GSM/EDGE/GPRS network 214 may, for example, support a particular amount of bandwidth for the exchange of multimedia information. The method of FIG. 7 may automatically determine whether additional bandwidth is needed to support the consumption of the various components of the multimedia information desired by the user (block 716), and may establish a new, simulcast path to the mobile access device, based upon criteria in the user profile, and the amount of bandwidth needed for the components that may be available (block 718). For example, the capabilities available via the wireless wide area network (e.g., the GSM/EDGE/GPRS network 214) used to initiate the exchange may be sufficient to provide only basic, telephone-quality audio, while the capabilities of the mobile access device 224, and the multimedia information content available may offer the user the potential of stereo CD-quality audio and video.

A representative embodiment of the present invention may provide the lower quality of service level of telephone-quality audio via the wireless wide area network and may, based upon user defined criteria and other information in a user profile or subscriber database, raise the user quality of service experienced by employing additional, simulcast or multicast communication paths. Examples of possible user-defined criteria and information include user-defined limits on cost; an indication of the desired level mobility; a service provider preference; indicators of desired quality of service such as bit rate, frame rate, stereo vs. monaural sound, gray scale levels, color depth, spatial resolution, and the like; the existence of an associated broadband access gateway; and other information related to the provision of service to the user may be available in the user profile. The method of FIG. 7 then loops after each new simulcast path is identified and/or established, to determine whether additional bandwidth is needed (block 716). If no additional bandwidth is needed to meet the user-defined criteria in the user profile, the exchange and consumption of the desired multimedia information may proceed via the established paths or channels (block 720), and the method of FIG. 7 ends (block 722).

Although not shown in the illustration of FIG. 7, the user of the mobile access device may be notified of the option to add communication paths or channels, to enable the consumption of multimedia information components for which bandwidth is not presently available within the guidelines or rules in a user profile. Information regarding aspects of the additional components, and improvements in quality of service, for example, may be provided along with any additional cost to the user.

FIG. 8 shows a flowchart illustrating another exemplary method of consuming simulcasted and/or multicasted multimedia information via a broadband access gateway, in accordance with a representative embodiment of the present invention. The following description makes reference to elements of FIG. 2 to aid the reader in understanding the method illustrated in FIG. 8. The method of FIG. 8 begins with a mobile access device such as, for example, the mobile access device 224 in an idle state (block 810). The user of the mobile access device 224 may wish to consume multimedia information, and may initiate such an exchange via a wireless wide area network such as the GSM/EDGE/GPRS network 214, for example (block 812). The wireless wide area network (e.g., the GSM/EDGE/GPRS network 214) may, for example, access a user profile or subscriber database such as the user profile 219 accessible to the broadband access gateway 218, or the user profile 235 at the wireless carrier central office 214b (block 814). The user profile may contain user-defined guidelines, limits, values, rules, capabilities, and parameters such as those described above with respect to FIG. 7, which may be employed in the selection of network resources used to provide service to the subscriber.

In the method of FIG. 8, the wireless wide area network (e.g., the GSM/EDGE/GPRS network 214) may, for example, support a particular quality of service level, and may not be capable of providing the bandwidth allowed for the consumption of the desired multimedia information components based upon the user profile. The method of FIG. 8 may automatically elect to establish a simulcast path or channel, and may determine whether the mobile access device (e.g., the access device 224) is associated with a broadband access gateway such as the broadband access gateway 218, for example. A determination is made as to whether the mobile access device is associated with a broadband access gateway (block 816). If the mobile access device is not associated with a broadband access gateway, the method illustrated in FIG. 8 may establish a simulcast path or channel via a second wireless wide area network, for example (block 828), based upon information in a user profile. The desired components of multimedia information may then be simulcast to the mobile access device via the second wireless wide area network (block 830), and the method of FIG. 8 then ends.

If the mobile access device is associated with a broadband access gateway (block 816), a determination may then be made as to whether the mobile access device (e.g., access device 224) is within the coverage area of a personal area or wireless local area network supported by the associated broadband access gateway (block 820). If it is determined that the mobile access device is outside of the coverage area of the associated broadband access gateway, the simulcasted multimedia information may be cached at the associated broadband access gateway (block 826), and the wireless wide area network (e.g., the GSM/EDGE/GPRS network 214) may establish a simulcast path or channel to the mobile access device via a second wireless wide area network, for example (block 828), based upon information in a user profile. The desired components of multimedia information may then be simulcast to the mobile access device via the second wireless wide area network (block 830). The method of FIG. 8 then ends. If, however, it is determined that the mobile access device is within the coverage area of the broadband access gateway (block 820), a simulcast path or channel may be established to the mobile access device via the associated broadband access gateway (block 822), based upon information in the user profile or subscriber database (block 822). The user of the mobile access device (e.g., access device 224) may then consumer the desired components of multimedia information via the personal area and/or wireless local area network of the associated broadband access gateway (block 824), and the method of FIG. 8 then ends (block 832).

In a representative embodiment of the present invention, a broadband access gateway associated with an access device (e.g., the access device 224 of FIG. 2) may itself function to simulcast or multicast multimedia information for consumption via additional access devices within the coverage area of a personal area or wireless wide area network, or to which is connect in a wired fashion. For example, a broadband access gateway such as broadband access gateway 218 of FIG. 2 may simulcast or multicast the stereo audio component of multimedia information exchange to a stereo system (not shown in FIG. 2), the video component to a display such as the television 215, and an accompanying data or software component to the laptop 217 of FIG. 2. A broadband access gateway in accordance with the present invention may selectively cache or simulcast/multicast multimedia information based upon the quality of service level desired by the user. The selection of simulcasting/multicasting via a broadband access gateway, if available, and/or other communication paths or channels, and caching at a broadband access gateway may be based upon the contents of a user profile, and the communications paths available.

Aspects of the present invention may be seen in a system supporting consumption of multimedia information using simulcasting via a broadband access gateway. Such a system may comprise a gateway communicatively coupled to a broadband network and at least one wireless interface. The gateway may be capable of selectively exchanging multimedia information among the at least one wireless interface and the broadband network, and of communicating with a plurality of access devices via the at least one wireless interface. The access devices may be capable of concurrently exchanging components of the multimedia information using a plurality of communication paths. The gateway may be capable of a first exchange of a first component of the multimedia information with a first of the plurality of access device via a first communication path. The first exchange may be concurrent with a second exchange of a second component of the multimedia information with the first of the plurality of access device via a second communication path. In a representative embodiment of the present invention, the first communication path may comprise the at least one wireless interface and the broadband network, and the second communication path may comprise a wireless wide area network. In various representative embodiments of the present invention, the wireless wide area network may comprise at least one of a global system for mobile communications (GSM) network, a time division multiple access (TDMA) network, a code division multiple access (CDMA) network, and a universal mobile telecommunications system (UMTS) network.

In a representative embodiment in accordance with the present invention, the gateway may be capable of determining whether the first of the plurality of access devices is within a coverage area of the at least one wireless interface, and of establishing with a second of the plurality of access devices a third communication path for exchange of a component of the multimedia information. At least one of the first and second communication paths may be automatically selected based upon the multimedia information and at least one user-defined criteria, where the at least one user-defined criteria may comprise one of a cost, a bit rate, a bandwidth, a spatial resolution, a grey scale level, a color depth, a frame rate, quality of service, and a delivery delay. In a representative embodiment of the present invention, a communication path may be selected in response to input from a user of the first of the plurality of access devices, and the component of multimedia information may comprise at least one of streaming video, broadcast video, voice, digital data, text, digitized audio, digitized still images, digitized video, and digitized music.

In a representative embodiment of the present invention, the at least one wireless interface may be compliant with at least one of a Bluetooth V1.2 or compatible personal area network (PAN) specification and an Institute of Electrical and Electronics Engineers (IEEE) 802.15.3a or compatible ultra-wideband network specification. The at least one wireless interface may also be compliant with at least one of the Institute of Electrical and Electronics Engineers (IEEE)

802.11a, 802.11b, 802.11g, and 802.11n standards. The at least one wireless interface may comprise two wireless interfaces. The broadband network may comprise at least one of a digital subscriber line (DSL) network, a cable network, a satellite network, a local multipoint distribution system (LMDS), and the Internet, and the plurality of access devices may comprise at least one of a mobile multimedia handset, a personal digital assistant (PDA), and a personal computer (PC).

Other aspects of the present invention may be found in a mobile multimedia handset capable of communicating separate components of multimedia information using at least two wireless communication paths selected based upon the components of multimedia information and input from a user. In various representative embodiments of the present invention the components of multimedia information may comprise at least one of streaming video, broadcast video, voice, digital data, text, digitized audio, digitized still images, digitized video, and digitized music. The at least two wireless communication paths may comprise one of a personal area network compliant with a Bluetooth V1.2 or compatible specification, and an ultrawideband network compatible with an Institute of Electrical and Electronics Engineers (IEEE) 802.15.3a or compatible specification. The at least two wireless communication paths may also comprise a wireless local area network compliant with at least one of the Institute of Electrical and Electronics Engineers (IEEE) 802.11a, 802.11b, 802.11g, and 802.11n standards. Input from a user may comprise at least one key press in response to a user prompt, and may comprise at least one user-defined parameter resident in at least one of the handset, a broadband access gateway, and a wide area network.

Yet other aspects of the present invention may be observed in a machine-readable storage, having stored thereon a computer program having a plurality of code sections for operating a system supporting consumption of multimedia information by a plurality of access devices using simulcasting via a broadband access gateway communicatively coupled to a broadband network. The code sections may be executable by a machine for causing the machine to perform operations that may comprise establishing a first wireless communication path for the exchange of a first component of the multimedia information with a first of the plurality of access devices. The operations may also comprise establishing a second wireless communication path for the concurrent exchange of a second component of the multimedia information with the first of the plurality of access devices based upon at least one user-defined criteria. In addition, the operations may comprise concurrently exchanging multimedia information with the first of the plurality of access devices via the first and second wireless communication paths.

In a representative embodiment of the present invention, the first wireless communication path may comprise at least one of a personal area network and a wireless local area network, communicatively coupled to the broadband access gateway. The personal area network may be compliant with at least one of a Bluetooth V1.2 or compatible personal area network (PAN) specification and an Institute of Electrical and Electronics Engineers (IEEE) 802.15.3a compatible specification. The wireless local area network may be compliant with at least one of the Institute of Electrical and Electronics Engineers (IEEE) 802.11a, 802.11b, 802.11g, and 802.11n standards. The broadband network may comprise at least one of a digital subscriber line (DSL) network, a cable network, a satellite network, a local multipoint distribution system (LMDS), and the Internet. The second communication path may comprise a wireless wide area network, which may comprise at least one of a global system for mobile communications (GSM) network, a time division multiple access (TDMA) network, a code division multiple access (CDMA) network, and a universal mobile telecommunications system (UMTS) network.

In a representative embodiment of the present invention, the code sections executable by a machine may also cause the machine to perform operations comprising determining whether the first of the plurality of access devices is within a coverage area of the at least one wireless interface, and establishing with a second of the plurality of access devices a third communication path for exchange of a component of the multimedia information. At least one of the first and second wireless communication paths may be automatically selected based upon the multimedia information and at least one user-defined criteria, and the at least one user-defined criteria may comprise at least one of a cost, a bit rate, a bandwidth, a spatial resolution, a grey scale level, a color depth, a frame rate, quality of service, and a delivery delay. In a representative embodiment of the present invention, a wireless communication path may be selected in response to input from a user of the first of the plurality of access devices. The component of multimedia information may comprise at least one of streaming video, broadcast video, voice, digital data, text, digitized audio, digitized still images, digitized video, and digitized music, and the plurality of access devices may comprise at least one of a mobile multimedia handset, a personal digital assistant (PDA), and a personal computer (PC).

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5-gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineers (IEEE) 802.15.3a compliant wireless networks. Such personal area networks may operate in unlicensed radio frequency spectrum such as, for example, the 2.4 and 5-gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are considerations because all the information coming into and leaving the home from either the WAN side (i.e., the broadband connection side), or from the PAN side (i.e., the access device side) converges at the gateway. The PAN side may comprise Bluetooth, wireless LAN (IEEE 802.11a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

In a representative embodiment of the present invention, an access device such as, for example, a mobile multimedia handset engaged in a call served by a wireless wide area network may migrate to within the coverage area of an associated broadband access gateway with a wireless interface. The wireless wide area network may simulcast call content to the broadband access gateway via a broadband network. A user in the proximity of the broadband access gateway may be notified of the simulcasting of the call, and may elect to continue the call via a cordless phone or other access device that is compatible with the wired and/or wireless interfaces of the broadband access gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system supporting consumption of multimedia information using simulcasting at a plurality of locations, the system comprising:
a gateway device arranged to be locally coupled to at least one of a personal area network or a wireless local area network and communicatively coupled to a wireless wide area network via a broadband network, the gateway device arranged to establish communication of the multimedia information with an access device, the gateway device being operable to identify a location of the access device and access a user profile associated with the access device, where the user profile comprises user defined parameters that identify multimedia communication characteristics including a plurality of quality levels and a corresponding plurality of locations associated with the plurality of quality levels for delivering the multimedia information, the gateway device being arranged to deliver the multimedia information according to the level of quality in the user profile associated with the location.

2. The system according to claim 1 wherein the multimedia information comprises one or more of: streaming video, broadcast video, voice, digital data, text, digitized audio, digitized still images, digitized video, and/or digitized music.

3. The system according to claim 1 wherein the broadband network comprises one or more of: a digital subscriber line (DSL) network, a cable network, a satellite network, a local multipoint distribution system (LMDS), and/or the Internet.

4. The system according to claim 1 wherein the plurality of access devices comprises one or more of: a mobile multimedia handset, a personal digital assistant (PDA), and/or a personal computer (PC).

5. A machine-readable storage, having stored thereon a computer program having a plurality of code sections for operating a system supporting consumption of multimedia information by a plurality of access devices using simulcasting by a wireless wide area network to a gateway device having at least one wireless interface, the gateway device locally coupled to at least one of a personal area network or a wireless local area network and communicatively coupled to the wireless wide area network via a broadband network, the code sections executable by a machine for causing the machine to perform the operations comprising:
establishing communication of the multimedia information with a first access device;
identifying a location of the first access device;
retrieving a user profile associated with the first access device, where the user profile comprises user defined parameters that specify a plurality of quality levels and a corresponding plurality of locations associated with the plurality of quality levels; and
delivering the multimedia information according to the multimedia communication characteristics for the location.

6. The system according to claim 1 wherein the user profile is received from the broadband network.

7. The system according to claim 1 wherein the user profile is stored in the gateway device.

8. The system according to claim 1 wherein the gateway device determines path preferences from the multimedia communication characteristics to be used for communication with the access device for each location.

9. The system according to claim 1 wherein the multimedia communication characteristics associated with the location include a bandwidth of the multimedia information.

10. The system according to claim 1 wherein the multimedia communication characteristics associated with the location include a bit rate of the multimedia information.

11. The system according to claim 1 wherein the multimedia communication characteristics associated with the location include a color depth of the multimedia information.

12. The machine-readable storage according to claim 5 wherein the user profile is received from the broadband network.

13. The machine-readable storage according to claim 5 wherein the user profile is stored in the gateway device.

14. The machine-readable storage according to claim 5 wherein the gateway device determines path preferences from the multimedia communication characteristics to be used for communication with the access device for each location.

15. The machine-readable storage according to claim 5 wherein the multimedia communication characteristics associated with the location include a bandwidth of the multimedia information.

16. The machine-readable storage according to claim 5 wherein the multimedia communication characteristics associated with the location include a bit rate of the multimedia information.

17. The machine-readable storage according to claim 5 wherein the multimedia communication characteristics associated with the location include a color depth of the multimedia information.

18. The machine-readable storage according to claim 5 wherein the multimedia communication characteristics associated with the location include a frame rate of the multimedia information.

19. The system according to claim 1, wherein the access device is operable to display a notification screen comprising a plurality of levels of quality available for delivering the multimedia information based on the location of the access device.

20. The system according to claim 1, wherein the levels of quality correspond to additional communication paths for simulcasting the multimedia information.

21. The system according to claim 5 wherein the gateway device is operable to simulcast an audio component of the multimedia information to the first device of the plurality of access devices.

22. The system according to claim 21 wherein the gateway device is operable to simulcast a video component of the multimedia information to the second device of the plurality of access devices.

* * * * *